United States Patent

Caiger et al.

[11] Patent Number: 6,114,406
[45] Date of Patent: Sep. 5, 2000

[54] RADIATION CURABLE INK COMPOSITION

[75] Inventors: Nigel Antony Caiger, Somerset; Hartley David Selman, Saltford, both of United Kingdom

[73] Assignee: Coates Brothers PLC, United Kingdom

[21] Appl. No.: 09/125,533

[22] PCT Filed: Feb. 18, 1997

[86] PCT No.: PCT/GB97/00449

§ 371 Date: Dec. 3, 1998

§ 102(e) Date: Dec. 3, 1998

[87] PCT Pub. No.: WO97/31071

PCT Pub. Date: Aug. 28, 1997

[30] Foreign Application Priority Data

Feb. 21, 1996 [GB] United Kingdom ............... 9603667

[51] Int. Cl.$^7$ ............... C08F 2/48; C08F 2/50; C08J 7/18; C09D 11/00
[52] U.S. Cl. ............... 522/121; 522/182; 522/75; 522/909; 522/39; 522/28; 522/59; 427/514; 427/517; 106/31.27; 106/31.28; 106/31.6
[58] Field of Search ............... 522/121, 75, 909, 522/182, 39, 28, 57; 106/31.27, 31.28, 31.6; 427/514, 517

[56] References Cited

U.S. PATENT DOCUMENTS

| 4,125,678 | 11/1978 | Stvan et al. ............... 428/514 |
| 4,303,924 | 12/1981 | Young, Jr. ............... 346/1.1 |
| 4,876,384 | 10/1989 | Higbie et al. ............... 560/224 |
| 4,978,969 | 12/1990 | Chieng ............... 346/1.1 |
| 5,053,554 | 10/1991 | Higbie et al. ............... 562/622 |
| 5,110,889 | 5/1992 | Higbie et al. ............... 526/320 |
| 5,159,119 | 10/1992 | Higbie et al. ............... 568/670 |
| 5,243,085 | 9/1993 | Higbie et al. ............... 568/609 |
| 5,270,368 | 12/1993 | Lent et al. ............... 524/236 |
| 5,275,646 | 1/1994 | Marshall et al. ............... 160/20 B |
| 5,623,001 | 4/1997 | Figov ............... 522/84 |

FOREIGN PATENT DOCUMENTS

| 0465039 | 1/1992 | European Pat. Off. . |
| 0540203 | 5/1993 | European Pat. Off. . |
| 95/11219 | 4/1995 | WIPO . |

*Primary Examiner*—James J. Seidleck
*Assistant Examiner*—Sanza L. McClendon
*Attorney, Agent, or Firm*—Ostrolenk, Faber, Gerb & Soffen, LLP

[57] ABSTRACT

A UV-curable ink jet composition comprises a polyfunctional alkoxylated or polyalkoxylated acrylate monomer (80% to 95% by weight), a photoinitiator (e.g. from 1 to 15% by weight) and preferably a colorant (e.g. 1% to 10% by weight).

14 Claims, No Drawings

RADIATION CURABLE INK COMPOSITION

The present invention relates to a radiation-curable ink jet composition.

Ink jet printing is well suited to applications such as short-run label printing. The inks used for this process are of generally low viscosity and are based on organic or aqueous solvent systems. In either case, the solvent content is relatively high.

When high levels of organic solvents are employed, evaporation of such solvents in the drying process potentially presents both environmental and health and safety hazards.

On the other hand, aqueous-based systems also present problems. It is relatively difficult to drive-off the water in the drying process. Such aqueous systems also tend to have a poor affinity for non-absorbent surfaces.

One potential solution to these problems, particularly in relation to the solvent base, is to use hot melt inks. However, the durability of the resultant coatings is inadequate for various applications.

The applicants have conjectured that a better solution to the foregoing problems would be to utilise an ink jet process using an ink which is UV-curable.

In another context, it is relevant to note that it is common to print direct onto polyethylene or PET bottles by means of silk-screen printing as a less expensive alternative to labelling. However, this technique results in a lower print quality than can be achieved with conventional printing on a paper label. Thus, there is a need for a high quality printing process capable of printing direct onto curved polymer substrates, with a fast drying time.

One process which potentially also lends itself to solving this objective is ink-jet printing using an ink which is radiation-curable, for example UV-curable.

It is usual to formulate UV-curable inks using a monomeric or oligomeric base vehicle. However, such polymer materials do not give the low viscosity required for a UV-curable ink-jet ink suitable for the aforementioned application, without the use of organic solvents. Although polymerisable monomers are in principle better-suited to achieving low viscosity, it is a problem to find a suitable monomer which would have sufficiently low toxicity and high thermal stability yet which gives a sufficiently flexible and durable film upon curing.

This problem has now been solved in accordance with the present invention by formulating a UV ink which contains an alkoxylated or polyalkoxylated acrylate monomer, a photoinitiator and a colourant.

A UV-curable ink-jet ink which contains a polar conductive component and a polymerisable monomer is disclosed in EP-A-0 465 039. However, this does not meet the aforementioned requirements. This ink contains the polar conductive component because it relies on so-called continuous heads which direct the ink by means of an electrostatic process. Moreover, many of the particular monomers and oligomers said to be usable in this process have serious health and safety implications. Thus, avoidance of the polar conductive material and accompanying viscosity modifiers used in the inks disclosed in EP-A-0 465 039 would be highly desirable on environmental and toxicity grounds.

Analogous non-conductive inks are disclosed in EP-A-0 540 203 which cross-references EP-A-0 465 309. Both of the latter documents envisage use of monofunctional and polyfunctional acrylate monomers. Ethoxylated monofunctional and trifunctional (but not difunctional) materials are recited. These documents also teach that the inks may optionally contain up to 70% by weight of difunctional material and optionally up to 10% by weight of trifunctional material.

Another monomer-based composition is described in U.S. Pat. No. 4,303,924 but this is said to require application in an inert atmosphere.

UV-curable photoresists for printed circuit board applications and which contain low levels of ethoxylated acrylate monomers are disclosed in U.S. Pat. No. 5,270,368.

Thus, there remains a need for a low viscosity radiation-curable ink jet composition with low toxicity and/or irritancy and which produces high quality print.

A new form of ink has now been devised which overcomes the various aforementioned problems and meets the aforementioned objectives. Thus, one aspect of the present invention provides a radiation-curable ink jet composition comprising, from 80% to 95% by weight of the total composition of polyfunctional alkoxylated and/or polyfunctional polyalkoxylated acrylate monomer material; and a photoinitiator The amounts of the acrylate monomer, photoinitiator, and colourant will vary according to the particular equipment and application. However, typically, the amount of photoinitiator is from 1% to 15% by weight of the total composition.

The polyfunctional alkoxylated or polyalkoxylated acrylic monomer material preferably comprises one or more di- or tri-acrylates. However, alkoxylated or polyalkoxylated acrylic monomers of higher functionality may also be used alone or together with one or more di- and/or trifunctional materials. The only requirement is that the total amount of the polyfunctional material (alkoxylated+polyalkoxylated) is in the range of from 80% to 95% by weight of the total composition. Preferably, the number of alkoxy groups is from 1 to 20 per molecule of the monomer. Also preferably, the or each alkyleneoxy group is a $C_2$–$C_4$ alkyleneoxy. Most preferred are ethoxy (EO) or propoxy (PO) groups.

Suitable polyfunctional alkoxylated or polyalkoxylated acrylates may be selected from alkoxylated, preferably ethoxylated or propoxylated, varients of the following: neopentyl glycol diacrylates, butanediol diacrylates, trimethylpropane tri-acrylates and glyceryl triacrylate.

Optionally, compositions according to the invention may also contain some monofunctional alkoxylated or polyalkoxylated acrylated monomer material, for example at up to 10% by weight of the total composition, e.g. selected from one or more of alkoxylated, e.g. ethoxylated or propoxylated, variants of the following: tetrahydrofurfuryl acrylates, cyclohexyl acrylates, alkyl acrylates, nonylphenol acrylate and polyethylene or polypropylene glycol acrylates.

Optionally, compositions according to the present invention may also comprise minor amounts of non-alkoxylated radiation curable monomer material, either monofunctional or polyfunctional, preferably up to no more than 5% by weight of the total composition, e.g. selected from one or more of octyl acrylate, decyl acrylate, N-vinylpyrrollidone, ethyl digtycol acrylate, isobornyl acrylate, ethyl-hexyl acrylate, lauryl acrylate, butanediol monoacrylate, β-carboxyethyl acrylate, isobutyl acrylate, polypropylene glycol monomethacrylate, 2-hydroxyethyl methacrylate, difunctional (meth)acrylic acid esters, e.g. hexanediol di-(meth)acrylate, tetraethylene glycol diacrylate, tripropylene glycol diacrylate, butanediol diacrylate, polyethylene glycol diacrylates and triethylane glycol dimethacrylate. However, most preferably such non-alkoxylated monomer materials are omitted altogether.

A wide spectrum of photoinitiators are commercially available and a non-exhaustive selection of appropriate types include xanthone or thioxanthone types, benzophenone types, quinone types and phosphine oxide types. Sometimes, it is also desirable to include, as well as a primary photoinitiator, a co-initiator should also be included, most preferably of the amine or aminobenzoate type. In that case, it is preferred for the total photoinitiator (primary initiator plus co-initiator) to be within the aforementioned preferred range. For example, typical co-initiators are aminobenzoate and acrylated amine co-initiators, these generally being used with the xanthone/thioxanthone types of primary photoinitiator.

In its broadest sense, the present invention provides a radiation curable ink jet composition. That is to say, a composition which is curable by application of suitable radiation such as ultra-violet (UV) radiation or electron-beam radiation. Such a composition may be only a substantially colourless curable varnish or a substantially colourless radiation-curable base to which a colourant may be added. In the context of the present invention, the term colourant covers both materials which endow an actual visual colour and/or another optical property such as fluorescence. Colourants are typically included in amounts of from 1% to 10% of total colourant(s) by weight of the total composition.

Broadly speaking, colourants may be considered as falling into two classes, namely dyes, which are substantially soluble in the ink composition, and pigments, which are dispersed in the ink composition in the form of fine particles, if necessary with the aid of a suitable dispersant. Pigments may be selected from a wide range of classes, for example, Pigment Red 57:1, Pigment Red 52:2, Pigment Red 48:2, Pigment Blue 15:3, Pigment Green 7, Pigment Yellow 83, Pigment Yellow 13, Pigment White 6, Pigment Black 7. A non-exhaustive list of examples of such pigments include the following from the Irgalite range ex CIBA: Rubine L4, Bordeaux CM, Red 2BP, Blue LG, Green GLN, Yellow B3R and yellow LBG; as well as Tioxide RHD6 (ex Tioxide) and Special Black 250 (ex Degussa).

Ink compositions according to the present invention optionally may also comprise one or more minor ingredients, for example, surfactants, levelling additives, photoinitiator stabilisers, wetting agents and pigment stabilisers. The latter may for example be of polyester, polyurethane or polyacrylate types, especially in the form of high molecular weight block co-polymers, and would typically be incorporated at from 2.5% to 100% by weight of the pigment. Suitable examples are Disperbyk 161 or 162 (ex BYK Chemie) or Solsperse ex Zeneca. Suitable photoinitiator stabilisers include those disclosed in EP-A-0 465 039.

Suitable surfactants are preferably of non-ionic type, for example Fluorad FC430 (ex 3M Corp.). Such surfactants (when present) are preferably included in an amount of 0.1% to 10% by weight of the total composition.

Compositions according to the present invention are preferably substantially free or totally free of organic solvent. Thus, they preferably contain less than 10%, more preferably less than 5%, especially less than 1% and most preferably less than 0.1% of organic solvent(s) as expressed by weight of the total composition.

The invention will now be explained in more detail by way of the following non-limiting examples, in which all amounts expressed as percentages are percentages by weight of the total composition. All percentages herein, likewise represent percentages by weight of the total composition, unless it is explicitly specified otherwise.

EXAMPLE 1

| | |
|---|---|
| Isobornyl acrylate | 50.0 |
| Ethoxylated trimethylol propane triacrylate | 27.5 |
| Propoxylated neopentyl glycol diacrylate | 15.0 |
| Pigment blue 15:3 | 3.0 |
| High molecular weight hyperdispersant | 0.5 |
| 2-ethyl anthraquinone (photoinitiator) | 3.7 |
| Fluoro surfactant | 0.3 |
| | 100% |

EXAMPLE 2

| | |
|---|---|
| Ethoxylated neopentyl glycol diacrylate | 93.0 |
| Pigment black 7 | 2.5 |
| High molecular weight block co-polymer dispersant | 0.5 |
| 2-ethyl anthraquinone (photoinitiator) | 3.7 |
| Fluoro surfactant | 0.3 |
| | 100% |

EXAMPLE 3

| | |
|---|---|
| Ethoxylated trimethylol propane triacrylate | 28.0 |
| Isobornyl acrylate | 64.7 |
| Pigment black 7 | 2.5 |
| High molecular weight block co-polymer dispersant | 0.5 |
| Isopropyl thioxanthone (photoinitiator) | 1.0 |
| 2-benzyl-2-dimethylamine-1-(4 morpholinopheny) butan-1-one (photoinitiator) | 0.5 |
| 4-phenyl ibenzophenone (photoinitiator) | 1.0 |
| (2-ethyl)lexyl 4-dimethylamino benzoate (co-initiator/synergist) | 1.5 |
| Fluoro surfactant | 0.3 |
| | 100% |

EXAMPLE 4

| | |
|---|---|
| Polyethylene glycol diacrylate | 5.2 |
| 2(2-ethoxyethoxy)ethylacrylate | 50.2 |
| Ethoxylated trimethylol propane triacrylate | 30.0 |
| Pigment black 7 | 2.5 |
| High molecular weight block co-polymer dispersant | 0.5 |
| Acrylated amino co-initiator | 7.0 |
| Isopropyl thioxanthone (photoinitiator) | 2.5 |
| 2-benzyl-2-dimethylamine-1-(4 morpholinopheny) butan-1-one (photoinitiator) | 1.0 |
| 4-phenyl ibenzophenone (photoinitiator) | 1.0 |
| Fluoro surfactant | 0.3 |
| | 100% |

EXAMPLE 5

| | |
|---|---|
| Isobornyl acrylate | 40.0 |
| 2(2-ethoxyethoxy) ethylacrylate | 20.0 |
| Propoxylated neopentyl glycol diacrylate | 10.0 |
| Ethoxylated trimethylol propane triacrylate | 22.5 |
| Pigment red 48:2 | 3.0 |

| | |
|---|---|
| -continued | |
| High molecular weight block co-polymer dispersant | 0.5 |
| 2-ethyl anthraquinone (photoinitiator) | 3.7 |
| Fluoro surfactant | 0.3 |
| | 100% |

In the light of these Examples, modifications of such Examples, as well as other Examples, all within the scope of the invention as defined by the appended claims, will now be apparent to persons skilled in this art.

What is claimed is:

1. A radiation-curable ink jet composition comprising:
   (a) from 80% to 95% by weight of the total composition of a material selected from the group consisting of polyfunctional alkoxylated monomer material, polyfunctional polyalkoxylated acrylate monomer material and mixtures thereof; and
   (b) a photoinitiator.

2. The composition of claim 1, comprising from 1% to 10% by weight of the composition of the photoinitiator.

3. The composition of claim 1, further comprising a colourant.

4. The composition of claim 3, comprising from 1% to 10% by weight of the composition of the colourant.

5. The composition of claim 3, wherein the colourant comprises a pigment.

6. The composition of claim 1, wherein the acrylate monomer comprises a di- or tri-acrylate.

7. The composition of claim 1, wherein the acrylate monomer comprises a ethoxylated, polyethoxylated, propoxylated and/or polypropoxylated material.

8. The composition of claim 1, further comprising a co-photoinitiator.

9. The composition of claim 1, wherein the co-photoinitiator comprises an amine or amino-benzoate co-photoinitiator.

10. The composition of claim 1, further comprising a surfactant.

11. The composition of claim 10, comprising from 0.1% to 10% by weight of the composition of the surfactant.

12. The composition of claim 10, wherein the surfactant comprises a nonionic surfactant.

13. The composition of claim 1, comprising less than 10% of total organic solvent by weight of the total composition.

14. A method of ink jet printing onto a substrate using a printer provided with piezoelectric print heads and an ink having the composition of claim 1, the method comprising the steps of:
   (a) supplying the said print heads with the said ink; and
   (b) applying the said ink to the said substrate with the said print heads.

* * * * *